United States Patent
Ogawa (10) Patent No.: US 9,537,193 B2
(45) Date of Patent: Jan. 3, 2017

(54) FUEL CELL SYSTEM (75) Inventor: Tetsuya Ogawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 121 days.

(21) Appl. No.: 14/344,755

(22) PCT Filed: Sep. 4, 2012

(86) PCT No.: PCT/JP2012/073006
§ 371 (c)(1),
(2), (4) Date: Mar. 13, 2014

(87) PCT Pub. No.: WO2013/039022
PCT Pub. Date: Mar. 21, 2013

(65) Prior Publication Data
US 2015/0010785 A1    Jan. 8, 2015

(30) Foreign Application Priority Data
Sep. 15, 2011   (JP) .................. 2011-201630

(51) Int. Cl.
*H01M 16/00* (2006.01)
*H01M 8/0612* (2016.01)
(Continued)

(52) U.S. Cl.
CPC ....... *H01M 16/006* (2013.01); *H01M 8/04007* (2013.01); *H01M 8/04014* (2013.01);
(Continued)

(58) Field of Classification Search
CPC .. H01M 16/006; H01M 10/613; H01M 10/66; H01M 10/615; H01M 10/399; H01M 10/3909; H01M 10/63; H01M 8/04007; H01M 8/0618; H01M 8/04014; H01M 8/04164; H01M 2250/402; H01M 2250/405; H01M 2008/1293; Y02B 90/16; Y02B 90/12; Y02E 60/50; Y02E 60/525
See application file for complete search history.

(56) References Cited

U.S. PATENT DOCUMENTS

| 7,045,232 B1* | 5/2006 | Duebel ............... H01M 8/0612 429/412 |
| 2001/0021468 A1* | 9/2001 | Kanai ................ H01M 8/04119 429/414 |

(Continued)

FOREIGN PATENT DOCUMENTS

| JP | 06-176792 | 6/1994 |
| JP | 2002-334710 | 11/2002 |
| JP | 2004-355860 | 12/2004 |
| JP | 2009-37871 | 2/2009 |
| JP | 2009-168275 | 7/2009 |
| JP | 2011-23168 | 2/2011 |
| WO | WO 2010/113519 | * 10/2010 .......... H01M 8/0407 |

OTHER PUBLICATIONS

Japanese Office Action dated Aug. 5, 2014, Application No. 2011-201630, partial English translation included.

*Primary Examiner* — Patrick Ryan
*Assistant Examiner* — Aaron Greso
(74) *Attorney, Agent, or Firm* — Rankin, Hill & Clark LLP (57) ABSTRACT

A fuel cell system includes a fuel cell module for generating electrical energy by electrochemical reactions of a fuel gas and an oxygen-containing gas, a condenser for condensing water vapor in an exhaust gas discharged from the fuel cell module by heat exchange between the exhaust gas and a coolant to collect the condensed water and supplying the collected condensed water to the fuel cell module. The condenser includes an air cooling condensing mechanism using the oxygen-containing gas as the coolant. The air cooling condensing mechanism includes a secondary battery for inducing endothermic reaction during charging and inducing exothermic reaction during discharging.

7 Claims, 7 Drawing Sheets

(51) Int. Cl.
| | |
|---|---|
| *H01M 10/39* | (2006.01) |
| *H01M 8/04014* | (2016.01) |
| *H01M 8/04119* | (2016.01) |
| *H01M 8/04007* | (2016.01) |
| *H01M 10/615* | (2014.01) |
| *H01M 10/66* | (2014.01) |
| *H01M 10/613* | (2014.01) |
| *H01M 8/06* | (2016.01) |
| *H01M 8/04* | (2016.01) |
| *H01M 8/12* | (2016.01) |
| *H01M 10/63* | (2014.01) |

(52) U.S. Cl.
CPC ..... *H01M 8/04164* (2013.01); *H01M 8/0618* (2013.01); *H01M 10/3909* (2013.01); *H01M 10/399* (2013.01); *H01M 10/613* (2015.04); *H01M 10/615* (2015.04); *H01M 10/66* (2015.04); *H01M 10/63* (2015.04); *H01M 2008/1293* (2013.01); *H01M 2250/402* (2013.01); *H01M 2250/405* (2013.01); *Y02B 90/12* (2013.01); *Y02B 90/16* (2013.01); *Y02E 60/50* (2013.01); *Y02E 60/525* (2013.01)

(56) References Cited

U.S. PATENT DOCUMENTS

| | | | |
|---|---|---|---|
| 2002/0162693 A1* | 11/2002 | Mizuno | B60L 11/1892 180/65.1 |
| 2002/0168556 A1 | 11/2002 | Leboe et al. | |
| 2005/0100777 A1* | 5/2005 | Gurin | H01M 8/04097 429/415 |
| 2005/0255371 A1* | 11/2005 | Kwon | H01M 4/8626 429/434 |
| 2008/0145749 A1* | 6/2008 | Iacovangelo | H01M 2/1646 429/130 |
| 2008/0220319 A1* | 9/2008 | Takagi | H01M 2/1077 429/82 |
| 2009/0123807 A1* | 5/2009 | Reiser | H01M 8/0258 429/409 |
| 2010/0203404 A1 | 8/2010 | Miyazaki | |
| 2011/0214930 A1* | 9/2011 | Betts | H01M 10/60 180/65.1 |
| 2012/0021321 A1* | 1/2012 | Yasuda | H01M 8/04007 429/442 |
| 2012/0135322 A1 | 5/2012 | Yoshimine | |

\* cited by examiner

| W: ELECTRICAL ENERGY / T: TEMPERATURE | BELOW RANGE | WITHIN RANGE | ABOVE RANGE |
|---|---|---|---|
| BELOW RANGE | A INCREASE TEMPERATURE (OTHER THAN DISCHARGING) | B INCREASE TEMPERATURE (DISCHARGING CONDITION) | C INCREASE TEMPERATURE (DISCHARGING CONDITION) |
| WITHIN RANGE | D CHARGING (CHARGING CONDITION) | E CHARGING/ DISCHARGING | F DISCHARGING (DISCHARGING CONDITION) |
| ABOVE RANGE | G DECREASE TEMPERATURE (CHARGING CONDITION) | H DECREASE TEMPERATURE (CHARGING CONDITION) | I DECREASE TEMPERATURE (OTHER THAN CHARGING) |

FIG. 4

| PROCESS | TEMPERATURE T | ELECTRICAL ENERGY W | REGULATOR VALVE | CHARGING/DISCHARGING CONDITION |
|---|---|---|---|---|
| A INCREASE TEMPERATURE (OTHER THAN DISCHARGING) | BELOW RANGE | BELOW RANGE | AIR COOLING UP WATER COOLING DOWN | NONE (CHARGING/DISCHARGING IS NOT PERFORMED. INCREASE TEMPERATURE UP TO AN OPERABLE RANGE (TEMPERATURE)) |
| B INCREASE TEMPERATURE (DISCHARGING CONDITION) | BELOW RANGE | WITHIN RANGE | AIR COOLING UP WATER COOLING DOWN | IF "REQUESTED OUTPUT > FC OUTPUT" DISCHARGING |
| C INCREASE TEMPERATURE (DISCHARGING CONDITION) | BELOW RANGE | ABOVE RANGE | AIR COOLING UP WATER COOLING DOWN | IF "REQUESTED OUTPUT > FC OUTPUT" DISCHARGING |
| D CHARGING (CHARGING CONDITION) | WITHIN RANGE | BELOW RANGE | MAINTAIN AIR COOLING MAINTAIN WATER COOLING | IF "REQUESTED OUTPUT < FC OUTPUT" CHARGING |
| E CHARGING/ DISCHARGING | WITHIN RANGE | WITHIN RANGE | MAINTAIN AIR COOLING MAINTAIN WATER COOLING | IF "REQUESTED OUTPUT > FC OUTPUT" DISCHARGING IF "REQUESTED OUTPUT < FC OUTPUT" CHARGING |
| F DISCHARGING (DISCHARGING CONDITION) | WITHIN RANGE | ABOVE RANGE | MAINTAIN AIR COOLING MAINTAIN WATER COOLING | IF "REQUESTED OUTPUT > FC OUTPUT" DISCHARGING |
| G DECREASE TEMPERATURE (CHARGING CONDITION) | ABOVE RANGE | BELOW RANGE | AIR COOLING DOWN WATER COOLING UP | IF "REQUESTED OUTPUT < FC OUTPUT" CHARGING |
| H DECREASE TEMPERATURE (CHARGING CONDITION) | ABOVE RANGE | WITHIN RANGE | AIR COOLING DOWN WATER COOLING UP | IF "REQUESTED OUTPUT < FC OUTPUT" CHARGING |
| I DECREASE TEMPERATURE (OTHER THAN CHARGING) | ABOVE RANGE | ABOVE RANGE | AIR COOLING DOWN WATER COOLING UP | NONE (CHARGING/DISCHARGING IS NOT PERFORMED. DECREASE TEMPERATURE UP TO AN OPERABLE RANGE (TEMPERATURE)) |

FUEL CELL SYSTEM

TECHNICAL FIELD

The present invention relates to a fuel cell system including a fuel cell module for generating electrical energy by electrochemical reactions of a fuel gas and an oxygen-containing gas, and a condenser for condensing water vapor in an exhaust gas discharged from the fuel cell module by heat exchange between the exhaust gas and a coolant to collect the condensed water and supplying the collected condensed water to the fuel cell module.

BACKGROUND ART

Typically, a solid oxide fuel cell (SOFC) employs a solid electrolyte of ion-conductive oxide such as stabilized zirconia. The solid electrolyte is interposed between an anode and a cathode to form an electrolyte electrode assembly. The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas produced from hydrocarbon raw material by a reformer is used. In general, in the reformer, a reformed raw material gas is obtained from hydrocarbon raw material of a fossil fuel or the like, such as methane or LNG, and the reformed raw material gas undergoes steam reforming, for example, to produce a reformed gas (fuel gas).

The operating temperature of the fuel cell of this type is relatively high. Therefore, the exhaust gas containing the fuel gas and the oxygen-containing gas partially consumed in the power generation reaction is hot. In most cases, the exhaust gas of this type is discarded wastefully. Thus, it is desired to effectively utilize the heat energy.

Figure 6:
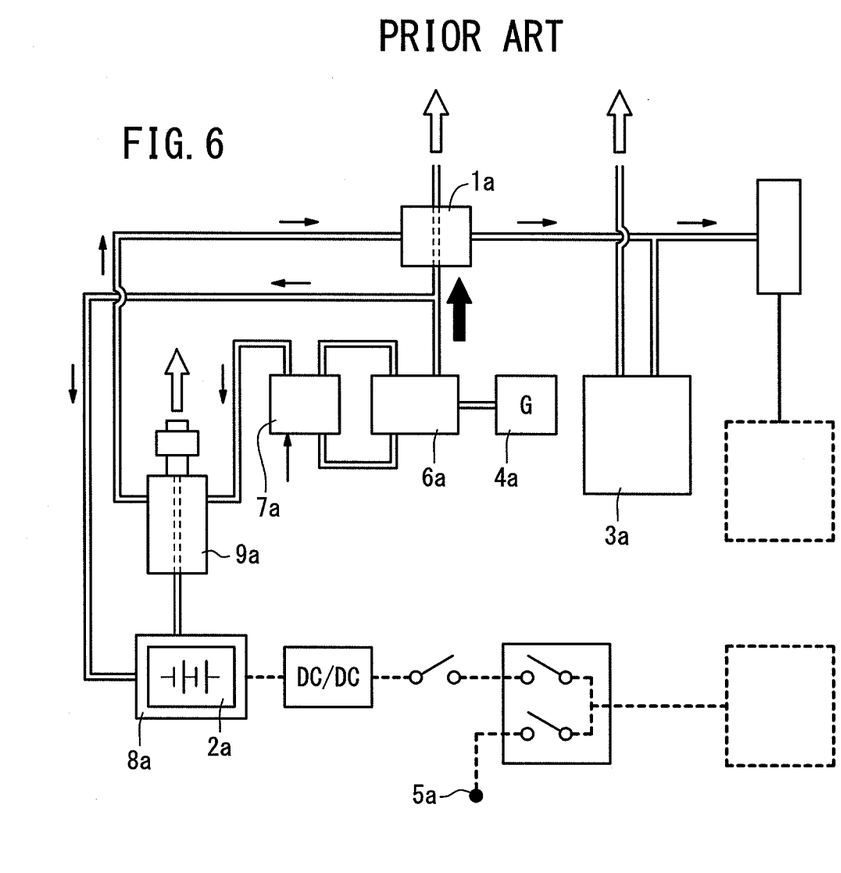
FIG. 6 is a diagram showing a power storage type heat electricity combined supply system according to the conventional technique 1.

In this regard, for example, a power storage type heat electricity combined supply system disclosed in Japanese Laid-Open Patent Publication No. 06-176792 (hereinafter referred to as the conventional technique 1) is known. In the system, as shown in FIG. 6, as heat supply systems, an absorbed water heating system for an exhaust heat boiler 1a, a heating system for an Na-S battery (sodium-sulfur battery) 2a, a heat supply system by a boiler 3a are provided. Further, as power supply systems, a power generator 4a, the Na-S battery 2a, and a commercial power system 5a are provided.

The absorbed water heating system as one of the heat supply systems includes a water-water heat exchanger 7a for cooling bearing coolant water of a gas turbine 6a or the like and a gas-water heat exchanger 9a provided in an exhaust air system for a constant temperature bath 8a which keeps the Na-S battery 2a at a constant temperature.

Absorbed water is heated by the water-water heat exchanger 7a and the gas-water heat exchanger 9a, and then, supplied to the exhaust heat boiler 1a. The heating system for the Na-S battery 2a is branched at the outlet to guide the hot exhaust gas from the internal combustion engine such as the gas turbine 6a into the constant temperature bath 8a through a heat insulation pipe, and to heat the Na-S battery 2a for keeping the Na-S battery 2a at the constant temperature.

According to the disclosure, excessive electrical energy is charged to achieve effective utilization of generated electricity, and power storage equipment for charging and discharging electrical energy as necessary is provided. Thus, since the hot exhaust gas which is already available is used as a heat source of the battery (Na-S battery) which needs to be kept at high temperature for operation at high temperature, the expense for the facilities such as conventional electric heaters and electrical energy required for the heaters can be reduced.

Figure 7:
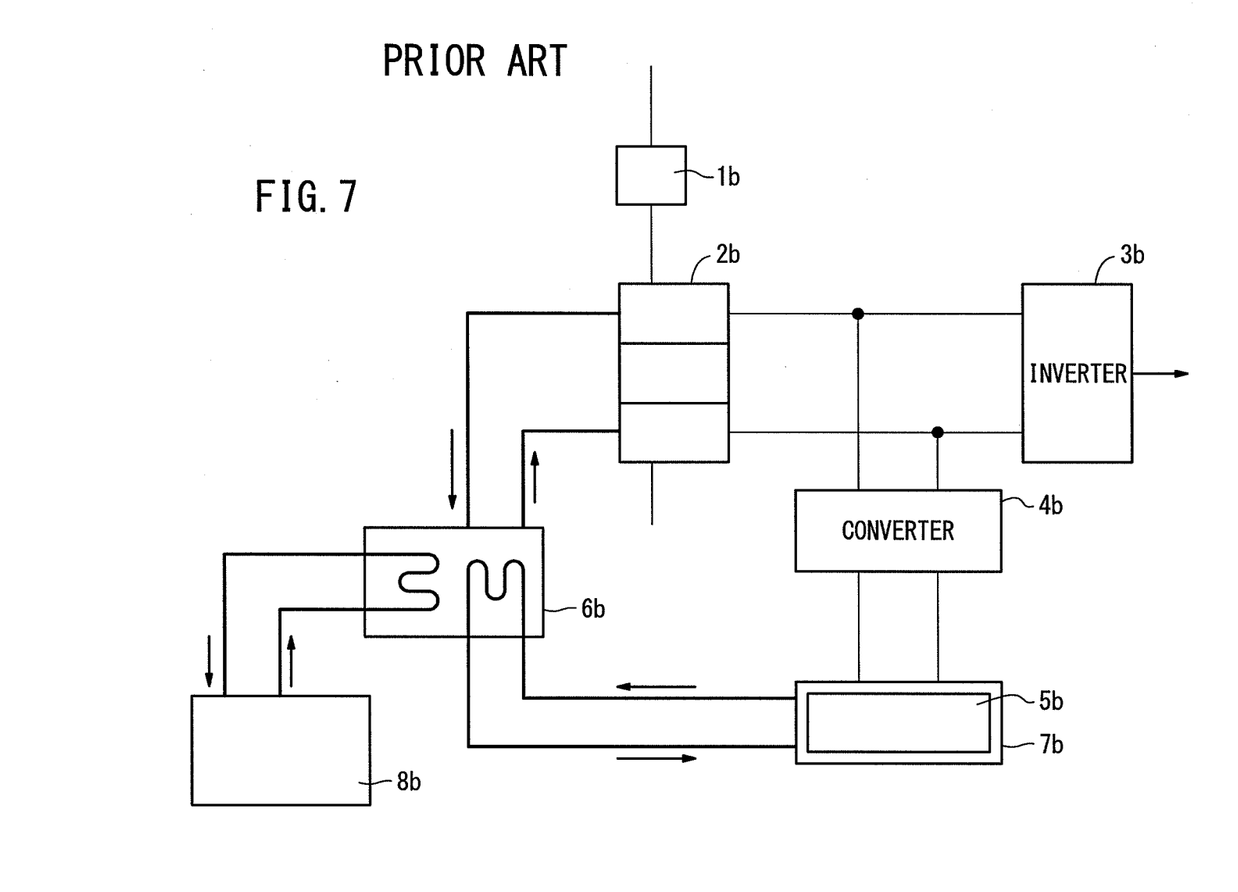
FIG. 7 is a diagram showing a load following type fuel cell power generation system according to the conventional technique 2.

Further, in a load following type fuel cell power generation system disclosed in Japanese Laid-Open Patent Publication No. 2002-334710 (hereinafter referred to as the conventional technique 2), as shown in FIG. 7, a fuel cell stack 2b is connected to a desulfurizer 1b as a fuel processing device, and an inverter 3b is connected to the fuel cell stack 2b. A sodium-sulfur battery 5b is connected between the fuel cell stack 2b and the inverter 3b through a bidirectional converter 4b.

A heat exchanger 6b connected to the fuel cell stack 2b through a coolant water pipe is provided. Further, a heater 7b for heating the sodium-sulfur battery 5b is provided. The heater 7b is connected to the heat exchanger 6b through a medium pipe for heat transfer, and a hot water supply unit 8b is connected to the heat exchanger 6b through a medium tube for heat transfer.

In the structure, electrical power outputted from the load following type fuel cell power generation system can be changed in accordance with the electrical power required for the load (load power) by charging and discharging the sodium-sulfur battery, and thus, can be changed to follow rapid fluctuations in the load power. According to the disclosure, since it is not required to heat the sodium-sulfur battery using electrical energy, no losses in the electrical energy occur.

SUMMARY OF INVENTION

In the conventional technique 1, in the Na-S battery, since endothermic reaction occurs during charging, by supplying heat of the exhaust gas, effective energy utilization is achieved. However, in the Na-S battery, since exothermic reaction occurs during discharging, the Na-S battery may be overheated. Therefore, it may be difficult to keep the Na-S battery in the operating state all the time.

Further, in the conventional technique 2, during charging of the sodium-sulfur battery (endothermic reaction) when the heat demand is large, the exhaust heat from the fuel cell stack 2b is not sufficient, and heat shortage may occur in the sodium-sulfur battery 5b undesirably. Further, during discharging of the sodium-sulfur battery 5b (exothermic reaction), there is no way to decrease the temperature of the sodium-sulfur battery. Therefore, it may be difficult to keep the sodium-sulfur battery 5b in the operating state all the time.

The present invention has been made to solve the problems of this type, and an object of the present invention is to provide a fuel cell system which makes it possible to facilitate water self-sustaining operation and thermally self-sustaining operation, and achieve improvement in the power generation efficiency, heat efficiency, and load following performance.

The present invention relates to a fuel cell system including a fuel cell module for generating electrical energy by electrochemical reactions of a fuel gas and an oxygen-containing gas, a condenser for condensing water vapor in an exhaust gas discharged from the fuel cell module by heat exchange between the exhaust gas and a coolant to collect the condensed water and supplying the collected condensed water to the fuel cell module, and a control device.

In the fuel cell system, the condenser includes an air cooling condensing mechanism using the oxygen-containing gas as the coolant, and the air cooling condensing mechanism includes a secondary battery for inducing endothermic reaction during charging and inducing exothermic reaction during discharging. The control device implements control to use the exhaust gas as a heat medium during charging, and use the oxygen-containing gas as the coolant during discharging to keep a temperature of the secondary battery in a chargeable and dischargeable state.

In the present invention, the air cooling condensing mechanism includes the secondary battery for inducing endothermic reaction during charging and inducing exothermic reaction during discharging. The temperature of the secondary battery is kept in a chargeable and dischargeable state using the exhaust gas as the heat medium during charging, and using the oxygen-containing gas as the coolant during discharging. In the system, by charging and discharging of the secondary battery, the electrical power outputted from the fuel cell system can be changed in accordance with the electrical power required for the load, and to follow rapid fluctuation of the electrical power required for the load easily.

Further, the exhaust gas is used during charging of the secondary battery, and the oxygen-containing gas is used during discharging of the secondary battery. Thus, it is possible to suppress losses of electrical power and achieve effective heat utilization without any excessive losses in the electrical power. Accordingly, improvement in the power generation efficiency and the heat efficiency, i.e., improvement in the overall efficiency is achieved.

Further, the temperature of the exhaust gas is decreased, and it becomes possible to condense the water vapor in the exhaust gas to collect the condensed water. Thus, generation of waste heat is suppressed, and water self-sustaining operation is facilitated. Further, since the temperature of the oxygen-containing gas is increased, thermally self-sustaining operation is facilitated easily.

Water self-sustaining operation herein means operation where the entire amount of water required for operating the fuel cell system is supplied within the fuel cell system, without supplying additional water from the outside. Further, thermally self-sustaining operation herein means operation where the entire amount of heat quantity required for operating the fuel cell system is supplied within the fuel cell system, and where the operating temperature of the fuel cell system is maintained using only heat energy generated in the fuel cell system, without supplying additional heat from the outside.

DESCRIPTION OF EMBODIMENTS

A fuel cell system 10 according to a first embodiment of the present invention is used in various applications, including stationary and mobile applications. For example, the fuel cell system 10 is mounted in a vehicle.

Figure 1:
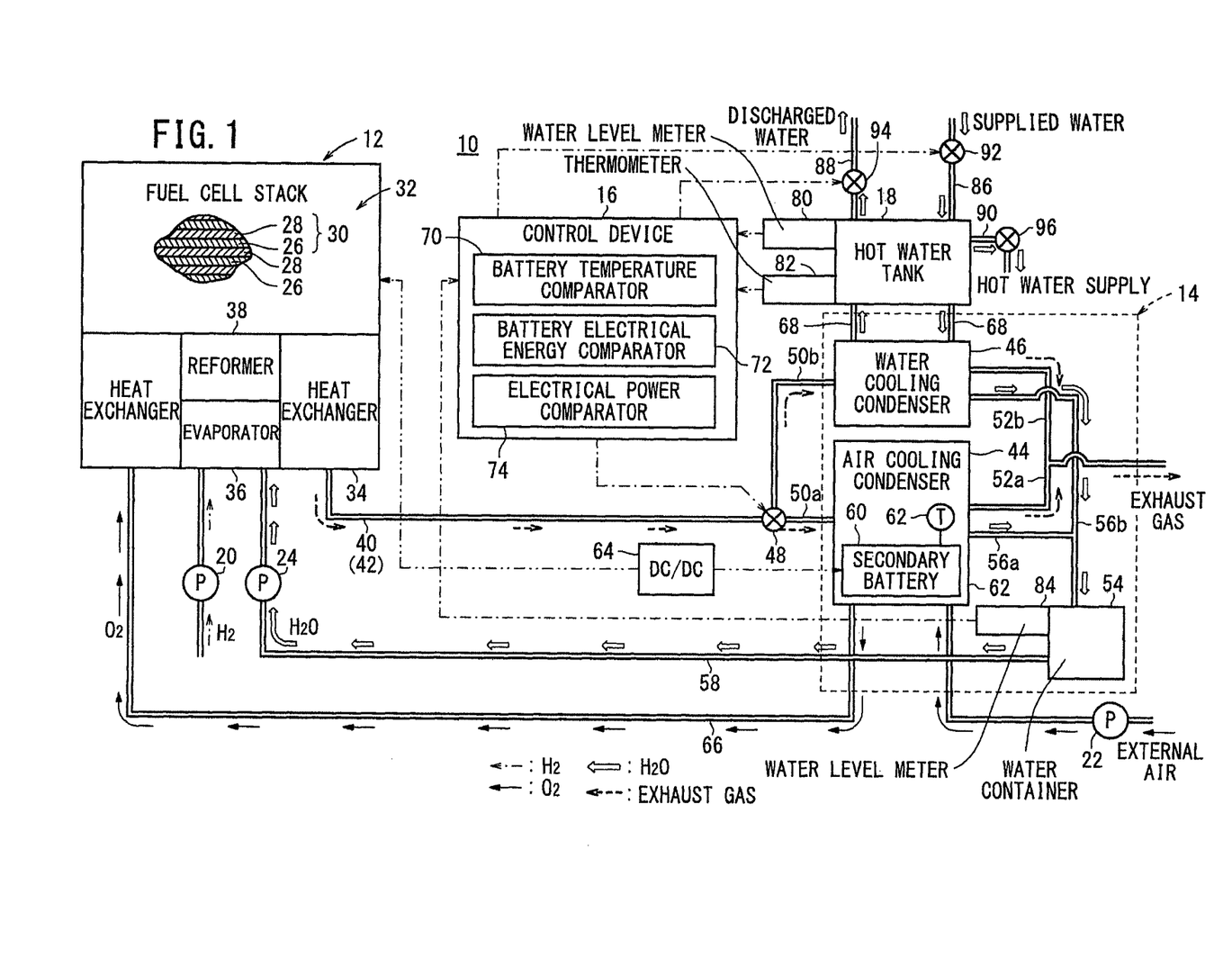
FIG. 1 is a diagram schematically showing structure of a fuel cell system according to a first embodiment of the present invention.

As schematically shown in FIG. 1, the fuel cell system 10 includes a fuel cell module 12 for generating electrical energy in power generation by electrochemical reactions of a fuel gas (hydrogen gas) and an oxygen-containing gas (air), a condenser 14 for condensing water vapor in an exhaust gas discharged from the fuel cell module 12 by heat exchange between the exhaust gas and a coolant to collect the condensed water and supplying the collected condensed water to the fuel cell module 12, a control device 16, and a hot water tank (storage unit) 18 for storing water as the coolant.

The fuel cell module 12 is connected to a fuel gas supply apparatus (including a fuel gas pump) 20 for supplying a raw fuel (e.g., city gas) to the fuel cell module 12, an oxygen-containing gas supply apparatus (including an air pump) 22 for supplying an oxygen-containing gas to the fuel cell module 12, and a water supply apparatus (including a water pump) 24 for supplying water to the fuel cell module 12.

The fuel cell module 12 includes a solid oxide fuel cell stack 32 formed by stacking a plurality of solid oxide fuel cells 30 in a vertical direction (or a horizontal direction). The fuel cells 30 are formed by stacking electrolyte electrode assemblies 26 and separators 28. Though not shown, each of the electrolyte electrode assemblies 26 includes a cathode, an anode, and a solid electrolyte (solid oxide) interposed between the cathode and the anode. For example, the electrolyte is made of ion-conductive solid oxide such as stabilized zirconia.

At a lower end (or an upper end) of the fuel cell stack 32 in the stacking direction, a heat exchanger 34 for heating the oxygen-containing gas before the oxygen-containing gas is supplied to the fuel cell stack 32, an evaporator 36 for evaporating water to produce a mixed fuel of water vapor and a raw fuel (e.g., city gas) chiefly containing hydrocarbon, and a reformer 38 for reforming the mixed fuel to produce a fuel gas (reformed gas) are provided.

The reformer 38 is a preliminary reformer for reforming higher hydrocarbon ($C_{2+}$) such as ethane ($C_2H_6$), propane ($C_3H_8$), and butane ($C_4H_{10}$) in the city gas (raw fuel) into a reformed gas chiefly containing methane ($CH_4$) by steam reforming. The operating temperature of the reformer 38 is several hundred ° C.

The operating temperature of the fuel cell 30 is high, at several hundred ° C. In the electrolyte electrode assembly 26, methane in the fuel gas is reformed to obtain hydrogen, and the hydrogen is supplied to the anode.

The heat exchanger 34 induces heat exchange between the partially consumed reactant gas discharged from the fuel cell stack 32 (hereinafter also referred to as the exhaust gas or the combustion exhaust gas) and the air as the fluid to be heated by allowing the exhaust gas and the air to flow in a counterflow manner for heating the air. The exhaust gas after heat exchange is discharged into an exhaust gas pipe 40, and the air after heat exchange is supplied as the oxygen-containing gas to the fuel cell stack 32.

The outlet of the evaporator 36 is connected to the inlet of the reformer 38, and the outlet of the reformer 38 is connected to a fuel gas supply passage (not shown) of the fuel cell stack 32. A main exhaust gas pipe 42 is provided for discharging the exhaust gas supplied to the evaporator 36. The main exhaust gas pipe 42 is formed integrally with the exhaust gas pipe 40.

The condenser 14 includes an air cooling condenser (air cooling condensing mechanism) 44 using the oxygen-containing gas as a coolant, a water cooling condenser (water cooling condensing mechanism) 46 using hot water stored in the hot water tank 18 as the coolant.

A regulator valve 48 is provided in the exhaust gas pipe 40 extending from the fuel cell module 12. Exhaust gas channels 50a, 50b are branched at the outlet of the regulator valve 48. The air cooling condenser 44 is connected to the exhaust gas channel 50a, and the water cooling condenser 46 is connected to the exhaust gas channel 50b.

The regulator valve 48 can regulate the flow rate of the exhaust gas supplied to the air cooling condenser 44 and the flow rate of the exhaust gas supplied to the water cooling condenser 46 separately. The exhaust gas may be supplied only to the air cooling condenser 44, the exhaust gas may be supplied only to the water cooling condenser 46, or the exhaust gas may be supplied to both of the air cooling condenser 44 and the water cooling condenser 46 at predetermined flow rates.

The regulator valve 48 may change the flow rate of the exhaust gas distributed to the exhaust gas channel 50a, and the flow rate of the exhaust gas distributed to the exhaust gas channel 50b to regulate the flow rates of the exhaust gas supplied to the exhaust gas channels 50a, 50b. In the control described later, it is required to increase or decrease the flow rates of the exhaust gas distributed to the exhaust gas channels 50a, 50b by increasing or decreasing the output of the fuel cell module 12 to increase or decrease the amount of the supplied exhaust gas.

At the outlets of the air cooling condenser 44 and the water cooling condenser 46, exhaust gas channels 52a, 52b for discharging the exhaust gas are provided, and condensed water channels 56a, 56b for supplying the condensed water to a water container 54 are provided. The water container 54 stores the condensed water, and the water container 54 is connected to the water supply apparatus 24 through a water channel 58. After the exhaust gas channels 52a, 52b are merged, the exhaust gas can be discharged to the outside of the condenser 14. The air cooling condenser 44 includes a secondary battery 60 for inducing endothermic reaction during charging and inducing exothermic reaction during discharging. Preferably, a high temperature type secondary battery such as a molten salt electrolyte battery or a sodium-sulfur battery is used. A temperature sensor 62 is attached to the secondary battery 60 for detecting the temperature of the secondary battery 60 itself. Data of the battery temperature T detected by the temperature sensor 62 is transmitted to the control device 16.

The secondary battery 60 is electrically connected to the fuel cell module 12 through a DC/DC converter 64. The electrical energy outputted from the fuel cell module 12 can be changed to follow the electrical power required for the load. The voltage of the electrical power outputted from the fuel cell module 12 is stepped down by the DC/DC converter 64, and the electrical power can be charged in the secondary battery 60.

An air supply pipe 66 is connected to the air cooling condenser 44. The oxygen-containing gas supply apparatus 22 is provided at the air supply pipe 66. The oxygen-containing gas from the air supply pipe 66 is supplied as the coolant into the air cooling condenser 44, and after the oxygen-containing gas is heated by heat exchange with the exhaust gas, the oxygen-containing gas is supplied to the fuel cell stack 32.

A circulation pipe 68 connected to the hot water tank 18 is provided in the water cooling condenser 46. The hot water in the hot water tank 18 is supplied as the coolant through the circulation pipe 68 into the water cooling condenser 46 for heat exchange with the exhaust gas, and the heated hot water is returned to the hot water tank 18.

The control device 16 implements control to use the exhaust gas as a heat medium during charging, and use the oxygen-containing gas as the coolant during discharging to keep the temperature of the secondary battery 60 in a chargeable and dischargeable state.

The control device 16 at least includes a battery temperature comparator 70 for comparing a battery temperature T with a predetermined battery temperature range, and a battery electrical energy comparator 72 for comparing battery electrical energy W of the secondary battery 60 with a predetermined battery electrical energy range, and an electrical power comparator 74 for comparing electrical power supplied from the fuel cell module 12 (electrical power output of the fuel cell) with a demanded electrical power (requested output).

The hot water tank 18 includes a water level meter (hot water level detector) 80 for detecting the water level of the hot water stored in the hot water tank 18 and a thermometer (hot water temperature detector) 82 for detecting the temperature of the hot water stored in the hot water tank 18. The water container 54 includes a water level meter (condensed water level detector) 84 for detecting the water level of the condensed water in the water container 54.

A water supply pipe 86 for receiving city water supplied from the outside, a water discharge pipe 88 for discharging water, and a hot water supply pipe 90 for supplying the stored hot water at a predetermined temperature are connected to the hot water tank 18. Valves 92, 94, and 96 are provided in the water supply pipe 86, the water discharge pipe 88, and the hot water supply pipe 90, respectively.

Operation of the fuel cell system 10 will be described below.

By operation of the fuel gas supply apparatus 20, for example, a raw fuel such as the city gas (including $CH_4$, $C_2H_6$, $C_3H_8$, $C_4H_{10}$) is supplied to the evaporator 36. Further, by operation of the water supply apparatus 24, water is supplied to the evaporator 36, and by operation of the oxygen-containing gas supply apparatus 22, the oxygen-containing gas such as the air is supplied to the heat exchanger 34 through the air cooling condenser 44.

In the evaporator 36, the raw fuel is mixed with the water vapor, and a mixed fuel is obtained. The mixed fuel is supplied to the inlet of the reformer 38. The mixed fuel undergoes steam reforming in the reformer 38. Thus, hydrocarbon of $C_{2+}$ is removed (reformed), and a reformed gas chiefly containing methane is obtained. The reformed gas flows through the outlet of the reformer 38, and the reformed gas flows into the fuel cell stack 32. Thus, the methane in the fuel gas is reformed, and the hydrogen gas is obtained. The fuel gas chiefly containing the hydrogen gas is supplied to the anodes (not shown).

The air supplied to the heat exchanger 34 moves along the heat exchanger 34, and the air is heated to a predetermined temperature by heat exchange with the exhaust gas as described later. The air heated by the heat exchanger 34 flows into the fuel cell stack 32, and the air is supplied to the cathodes (not shown).

Thus, in each of the electrolyte electrode assemblies 26, by electrochemical reactions of the fuel gas and the air, power generation is performed. The hot exhaust gas (several hundred ° C.) discharged to the outer circumferential region of each of the electrolyte electrode assemblies 26 flows through the heat exchanger 34, and heat exchange with the air is carried out. The air is heated to a predetermined temperature, and the temperature of the exhaust gas is decreased. The exhaust gas is supplied to the evaporator 36 to evaporate the water. After the exhaust gas passes through the evaporator 36, the exhaust gas is supplied from the main exhaust gas pipe 42 to the condenser 14 through the exhaust gas pipe 40.

Figure 2:
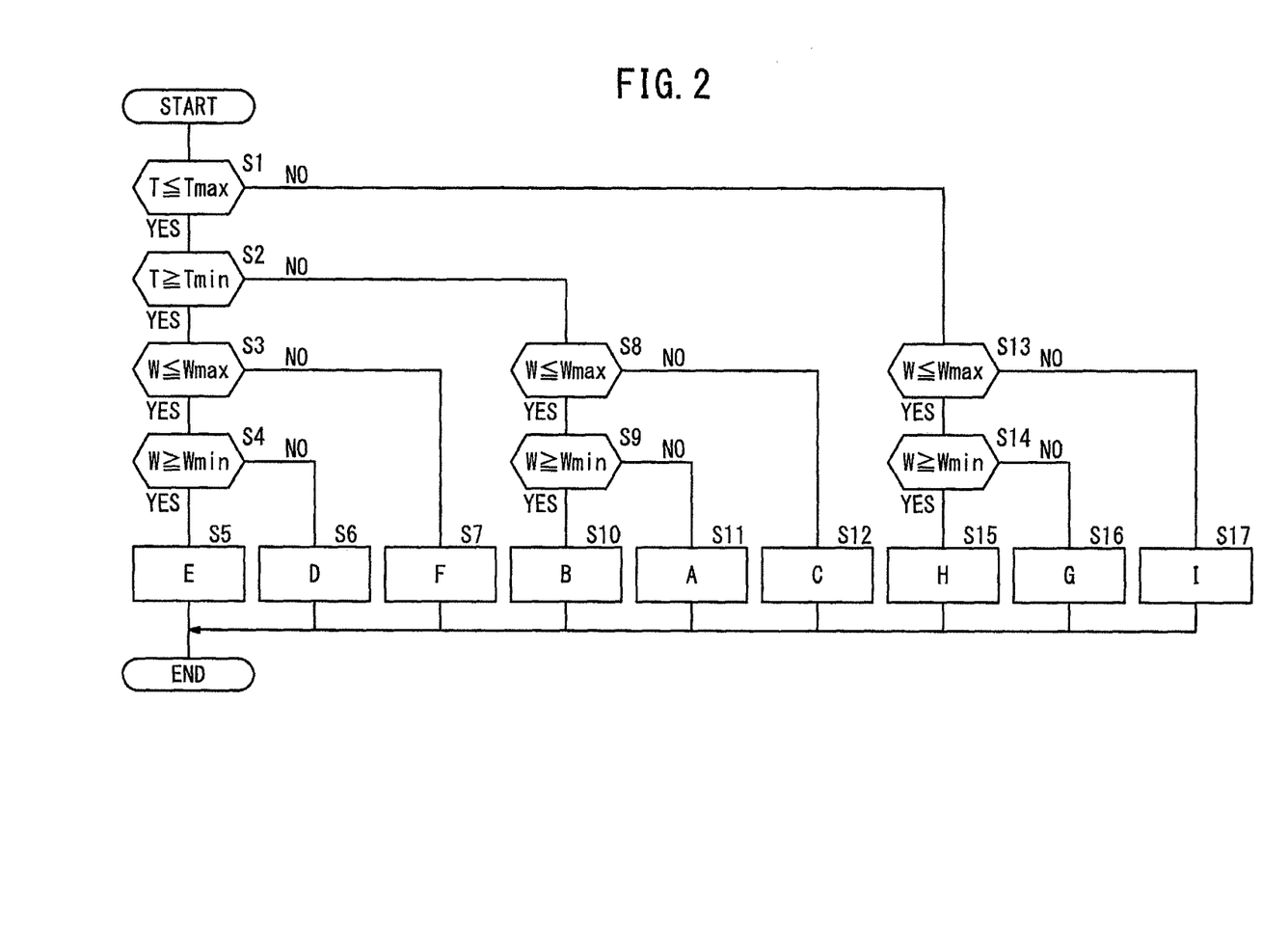
FIG. 2 is a flow chart showing a control method of the fuel cell system.
Figure 3:
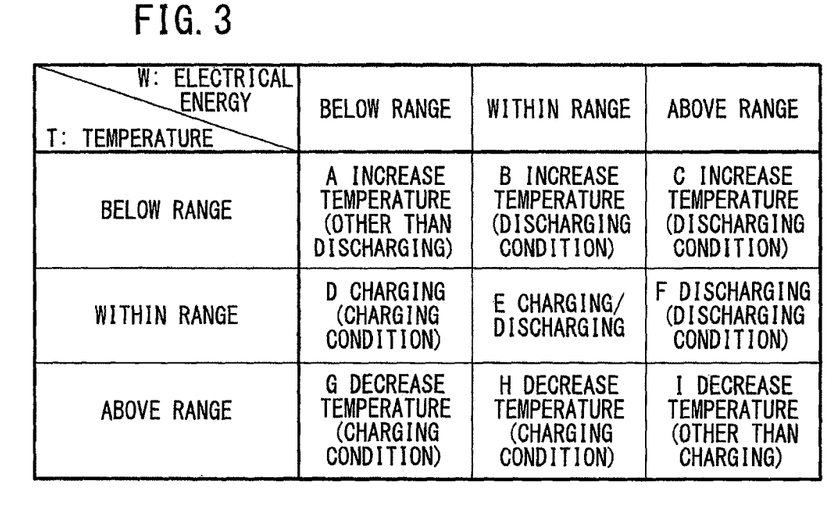
FIG. 3 is a control map of the control method.

Next, a control method in the condenser 14 will be described with reference to a flow chart shown in FIG. 2 and control maps shown in FIGS. 3 and 4.

Firstly, as a battery temperature range of the battery temperature T of the secondary battery 60, an upper limit battery temperature Tmax and a lower limit battery temperature Tmin are determined. Further, as a battery electrical energy range of the battery electrical energy W for the secondary battery 60, an upper limit battery electrical energy Wmax and a lower limit battery electrical energy Wmin are determined.

Figure 4:
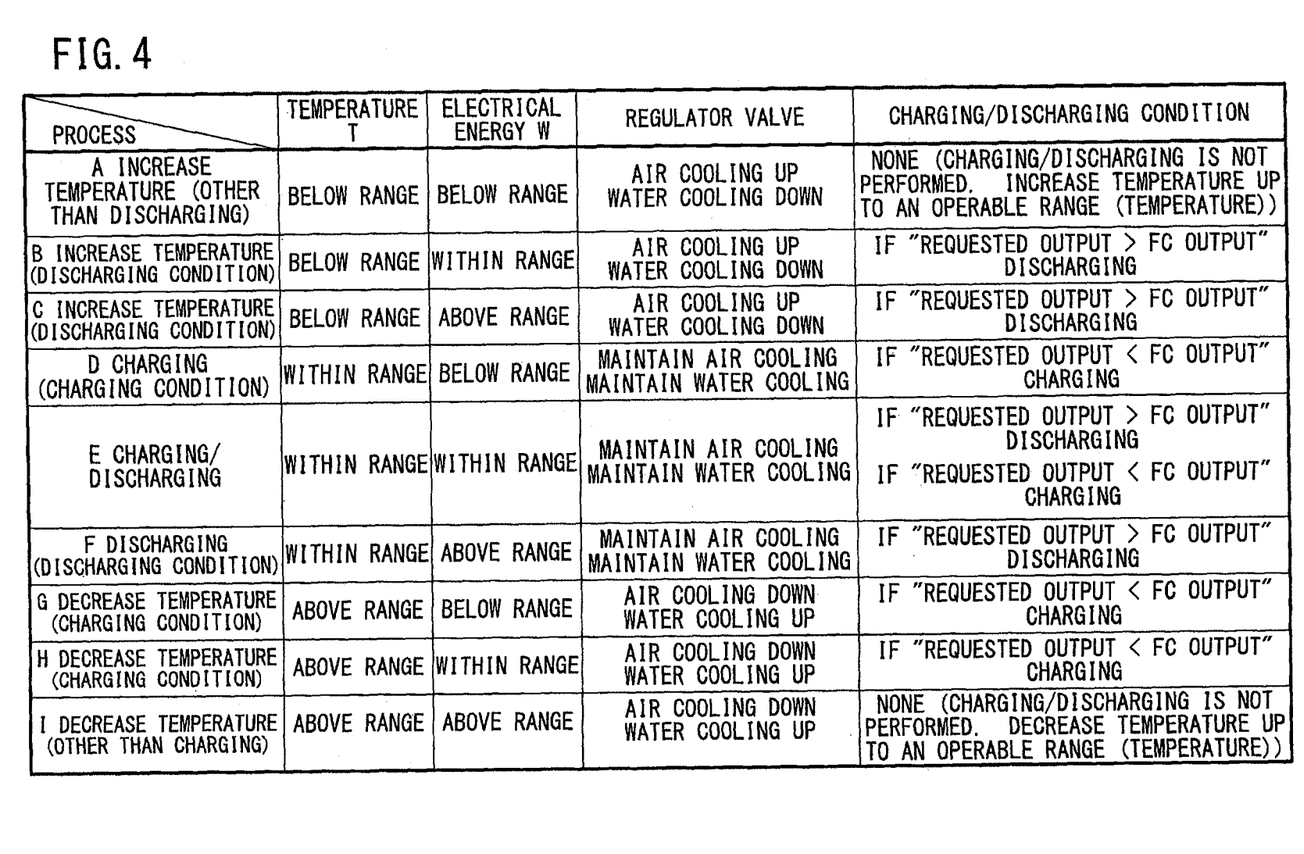
FIG. 4 is a control map showing details of the control method.

In FIG. 4, the "AIR COOLING UP" means a mode for increasing the flow rate of the exhaust gas supplied into the air cooling condenser 44, and the "AIR COOLING DOWN" means a mode for decreasing the flow rate of the exhaust gas supplied into the air cooling condenser 44. The "WATER COOLING UP" means a mode for increasing the flow rate of the exhaust gas supplied into the water cooling condenser 46, and the "WATER COOLING DOWN" means a mode for decreasing the flow rate of the exhaust gas supplied into the water cooling condenser 46.

In FIG. 4, "CHARGING/DISCHARGING CONDITION" means a condition for determining whether charging of the secondary battery 60 should be performed or discharging of the secondary battery 60 should be performed based on the relationship between the output supplied from the fuel cell module 12 and the required output. If the required output is larger than the supplied output, the secondary battery 60 is placed in the discharging mode, and if the required output is smaller than the supplied output, the secondary battery 60 is placed in the charging mode.

In the control device 16, the battery temperature T of the secondary battery 60 is compared with the predetermined battery temperature range by the battery temperature comparator 70. If it is determined that the battery temperature T is the upper limit battery temperature Tmax or less (YES in step S1), the routine proceeds to step S2.

In step S2, if it is determined that the battery temperature T is the lower limit battery temperature Tmin or more (YES in step S2), the routine proceeds to step S3 to compare the battery electrical energy W of the secondary battery 60 with the predetermined battery electrical energy range by the battery electrical energy comparator 72. If it is determined that battery electrical energy W is the upper limit battery electrical energy Wmax or less (YES in step S3), the routine proceeds to step S4.

In step S4, if it is determined that the battery electrical energy W is the lower limit battery electrical energy Wmin or more (YES in step S4), the routine proceeds to step S5 to perform a process E. That is, as shown in FIGS. 3 and 4, the battery temperature T of the secondary battery 60 is within the battery temperature range, and the battery electrical energy W of the secondary battery 60 is within the battery electrical energy range.

At this time, the flow rate of the exhaust gas supplied into the air cooling condenser 44 is maintained (air cooling is maintained), and the flow rate of the exhaust gas supplied to the water cooling condenser 46 is maintained (water cooling is maintained). Thus, the battery temperature T of the secondary battery 60 is maintained, and the battery electrical energy W is at a level where charging and discharging can be performed. The electrical power comparator 74 compares the supplied electrical power of the fuel cell module 12 with the demanded electrical energy. Thus, if the requested output is larger than the supplied output, electrical energy is discharged from the secondary battery 60, and if the requested output is smaller than the supplied output, electrical energy from the fuel cell module 12 is charged in the secondary battery 60.

Further, in step S4, if it is determined that the battery electrical energy W is less than the lower limit battery electrical energy Wmin (NO in step S4), the routine proceeds to step S6 to perform a process D. In this state, as shown in FIGS. 3 and 4, the battery temperature T of the secondary battery 60 is within the battery temperature range, and the battery electrical energy W of the secondary battery 60 is less than the battery electrical energy range.

In this process D, the flow rate of the exhaust gas supplied into the air cooling condenser 44, and the flow rate of the exhaust gas supplied into the water cooling condenser 46 are maintained. If the electrical power comparator 74 determines that the requested output is smaller than the supplied output, electrical energy from the fuel cell module 12 is charged in the secondary battery 60.

Further, in step S3, if it is determined that the battery electrical energy W exceeds the upper limit battery electrical energy Wmax (NO in step S3), the routine proceeds to step S7 to perform a process F. In this state, as shown in FIGS. 3 and 4, the battery temperature T of the secondary battery 60 is within the battery temperature range, and the battery electrical energy W of the secondary battery 60 exceeds the battery electrical energy range.

In this process F, the flow rate of the exhaust gas supplied into the air cooling condenser 44 and the flow rate of the exhaust gas supplied to the water cooling condenser 46 are maintained. Further, if the electrical power comparator 74 determines that the requested output is larger than the supplied output, electrical energy is discharged from the secondary battery 60.

In step S2, if it is determined that the battery temperature T is less than the lower limit battery temperature Tmin (NO in step S2), the routine proceeds to step S8 to determine whether the battery electrical energy W is the upper limit battery electrical energy Wmax or less. If it is determined that the battery electrical energy W is the upper limit battery electrical energy Wmax or less (YES in step S8), the routine proceeds to step S9.

In step S9, if it is determined that the battery electrical energy W is the lower limit battery electrical energy Wmin or more (YES in step S9), the routine proceeds to step S10 to perform a process B. In this state, as shown in FIGS. 3 and 4, the battery temperature T of the secondary battery 60 is less than the battery temperature range, and the battery electrical energy W of the secondary battery 60 is within the battery electrical energy range.

In this process B, the flow rate of the exhaust gas supplied into the air cooling condenser 44 is increased, and the flow rate of the exhaust gas supplied to the water cooling condenser 46 is maintained. Further, if the electrical power comparator 74 determines that the requested output is larger than the supplied output, electrical energy is discharged from the secondary battery 60.

In step S9, if it is determined that the battery electrical energy W is less than the lower limit battery electrical energy Wmin (NO in step S9), the routine proceeds to step S11 to perform a process A. In this state, as shown in FIGS. 3 and 4, the battery temperature T of the secondary battery 60 is less than the battery temperature range, and the battery electrical energy W of the secondary battery 60 is less than the battery electrical energy range.

In this process A, the flow rate of the exhaust gas supplied into the air cooling condenser 44 is increased, and the flow rate of the exhaust gas supplied to the water cooling condenser 46 is decreased. At this time, charging or discharging of the secondary battery 60 is not performed, and the temperature of the secondary battery 60 is increased up to a temperature range where the secondary battery 60 can be operated.

Further, in step S8, if it is determined that the battery electrical energy W exceeds the upper limit battery electrical energy Wmax (NO in step S8), the routine proceeds to step S12 to perform a process C. In this state, as shown in FIGS. 3 and 4, the battery temperature T of the secondary battery 60 is less than the battery temperature range, and the battery electrical energy W of the secondary battery 60 exceeds the battery electrical energy range.

In this process C, the flow rate of the exhaust gas supplied into the air cooling condenser 44 is increased, and the flow rate of the exhaust gas supplied to the water cooling condenser 46 is decreased. If the electrical power comparator 74 determines that the requested output is larger than the supplied output, electrical energy is discharged from the secondary battery 60.

Further, in step S1, if it is determined that the battery temperature T exceeds the upper limit battery temperature Tmax (NO in step S1), the routine proceeds to step S13. In step S13, if it is determined that the battery electrical energy W is the upper limit battery electrical energy Wmax or less (YES in step S13), the routine proceeds to step S14.

In step S14, if it is determined that the battery electrical energy W is the lower limit battery electrical energy Wmin or more (YES in step S14), the routine proceeds to step S15 to perform a process H. In this state, as shown in FIGS. 3 and 4, the battery temperature of the secondary battery 60 exceeds the battery temperature range, and the battery electrical energy W of the secondary battery 60 is within the battery electrical energy range.

In this process H, the flow rate of the exhaust gas supplied into the air cooling condenser 44 is decreased, and the flow rate of the exhaust gas supplied to the water cooling condenser 46 is increased. If the electrical power comparator 74 determines that the requested output is smaller than the supplied output, electrical energy from the fuel cell module 12 is charged in the secondary battery 60.

In step S14, if it is determined that the battery electrical energy W is less than the lower limit battery electrical energy Wmin (NO in step S14), the routine proceeds to step S16 to perform a process G. In this state, as shown in FIGS. 3 and 4, the battery temperature T of the secondary battery 60 exceeds the battery temperature range, and the battery electrical energy W of the secondary battery 60 is less than the battery electrical energy range.

In this process G, the flow rate of the exhaust gas supplied into the air cooling condenser 44 is decreased, and the flow rate of the exhaust gas supplied to the water cooling condenser 46 is increased. Further, if the electrical power comparator 74 determines that the requested output is smaller than the supplied output, electrical energy from the fuel cell module 12 is charged in the secondary battery 60.

Further, in step S13, if it is determined that the battery electrical energy W exceeds the upper limit battery electrical energy Wmax (NO in step S13), the routine proceeds to step S17 to perform a process I. In this state, as shown in FIGS. 3 and 4, the battery temperature T of the secondary battery 60 exceeds the battery temperature range, and the battery electrical energy W of the secondary battery 60 exceeds the battery electrical energy range.

In this process I, the flow rate of the exhaust gas supplied into the air cooling condenser 44 is decreased, and the flow rate of the exhaust gas supplied to the water cooling condenser 46 is increased. At this time, charging or discharging of the secondary battery 60 is not performed, and the temperature of the secondary battery 60 is decreased up to a temperature range where the secondary battery 60 can be operated.

In the first embodiment, the condenser 14 includes the air cooling condenser 44 using the oxygen-containing gas as the coolant, and the air cooling condenser 44 includes the secondary battery 60 for inducing endothermic reaction during charging and inducing exothermic reaction during discharging. The secondary battery 60 uses an exhaust gas as a heat medium during charging, and uses the oxygen-containing gas as the coolant during discharging to keep the temperature of the secondary battery 60 in a chargeable and dischargeable state.

In the system, by charging and discharging of the secondary battery 60, the electrical power outputted from the fuel cell module 12 can be changed in accordance with the electrical power required for the load, and to follow rapid fluctuation of the electrical power required for the load.

Further, the exhaust gas is used during charging of the secondary battery 60, and the oxygen-containing gas is used during discharging of the secondary battery 60. Thus, it is possible to suppress losses of electrical power and achieve effective heat utilization without any excessive losses in the electrical power. Accordingly, improvement in the power generation efficiency and the heat efficiency, i.e., improvement in the overall efficiency is achieved.

Further, the temperature of the exhaust gas is decreased, and it becomes possible to condense the water vapor in the exhaust gas to collect the condensed water. Thus, generation of waste heat is suppressed, and water self-sustaining operation is facilitated. Further, since the temperature of the oxygen-containing gas is increased, thermally self-sustaining operation is facilitated easily.

Water self-sustaining operation herein means operation where the entire amount of water required for operating the fuel cell system 10 is supplied within the fuel cell system 10, without supplying additional water from the outside. Further, thermally self-sustaining operation herein means operation where the entire amount of heat quantity required for operating the fuel cell system 10 is supplied within the fuel cell system 10, and where the operating temperature of the fuel cell system 10 is maintained using only heat energy generated in the fuel cell system 10, without supplying additional heat from the outside.

Further, the fuel cell system 10 includes the hot water tank 18 for storing hot water, and the condenser 14 includes the water cooling condenser 46 using the hot water stored in the hot water tank 18 as the coolant. In the structure, the heat energy of the exhaust gas can be collected in the hot water tank 18, and improvement in the energy efficiency is achieved. Moreover, the temperature of the exhaust gas is decreased, and it becomes possible to condense the water vapor in the exhaust gas to collect the condensed water. Thus, generation of waste heat is suppressed, and water self-sustaining operation is facilitated.

In this manner, since the air cooling condenser 44 and the water cooling condenser 46 are selectively used, or used in combination, the heat energy of the exhaust gas can be collected efficiently. Thus, water self-sustaining operation is achieved, and the temperature of the exhaust gas is decreased. Further, the demanded electrical power can be supplied reliably without being affected by the power generation output regardless of the state of the hot water, i.e., the amount of the stored hot water.

Further, since operation of the fuel cell module 12 does not rely on the capacity of the hot water tank 18, the fuel cell module 12 can be started and stopped less frequently, as few times as possible. Thus, improvement in the power generation efficiency is achieved easily.

Further, preferably, a molten salt electrolyte battery or a sodium-sulfur battery is used as the secondary battery 60. Thus, the secondary battery 60 can be suitably used to induce endothermic reaction during charging and induce exothermic reaction during discharging. Further, the operating temperature range of the secondary battery 60 can be matched with the operating temperature range of the fuel cell module 12.

Further, the control device 16 at least includes the battery temperature comparator 70 for comparing the battery temperature T of the secondary battery 60 with the predetermined battery temperature range and the battery electrical energy comparator 72 for comparing the battery electrical energy W of the secondary battery 60 with the predetermined battery electrical energy range.

In this system, the temperature of the secondary battery 60 is reliably kept in a chargeable and dischargeable state where the electrical energy can be charged in and discharged from the secondary battery 60, and charging/discharging of the secondary battery 60 is performed suitably. Further, during charging of the secondary battery 60, the exhaust gas can be supplied to the air cooling condenser 44, and during discharging of the secondary battery 60, the exhaust gas can be supplied to the water cooling condenser 46. Thus, improvement in the load following performance, the power generation efficiency, and the heat efficiency is achieved.

Further, the hot water tank 18 includes the water level meter 80 for detecting the water level of the stored hot water, and the thermometer 82 for detecting the temperature of the stored hot water. Thus, the state of the stored hot water, i.e., the amount (water level) of the stored hot water and the temperature of the stored hot water can be detected reliably.

Further, the condenser 14 includes the water container 54 for storing the condensed water and the water level meter 84 for detecting the water level of the condensed water in the water container 54. Thus, the state of the condensed water, i.e., the amount of the condensed water can be detected reliably.

Further, the fuel cell system 10 includes the regulator valve 48 for regulating the flow rate of the exhaust gas supplied to the air cooling condenser 44 and the flow rate of the exhaust gas supplied to the water cooling condenser 46. Thus, the amount of the exhaust gas supplied to the air cooling condenser 44 and the amount of the exhaust gas supplied to the water cooling condenser 46 can be regulated suitably. Accordingly, water self-sustaining operation is facilitated, and the electrical power required for the load can be supplied. Further, the temperature of the stored hot water can be maintained.

Further, the fuel cell module 12 includes the fuel cell stack 32, the heat exchanger 34, the evaporator 36, and the reformer 38. Thus, in particular, the present invention is optimally applicable to the fuel cell module 12 performing steam reforming, and the desired advantages are obtained.

Further, the fuel cell module 12 is a solid oxide fuel cell (SOFC) module. Thus, the fuel cell module 12 is optimally used in fuel cell systems operated at high temperature, and the desired advantages are obtained.

Figure 5:
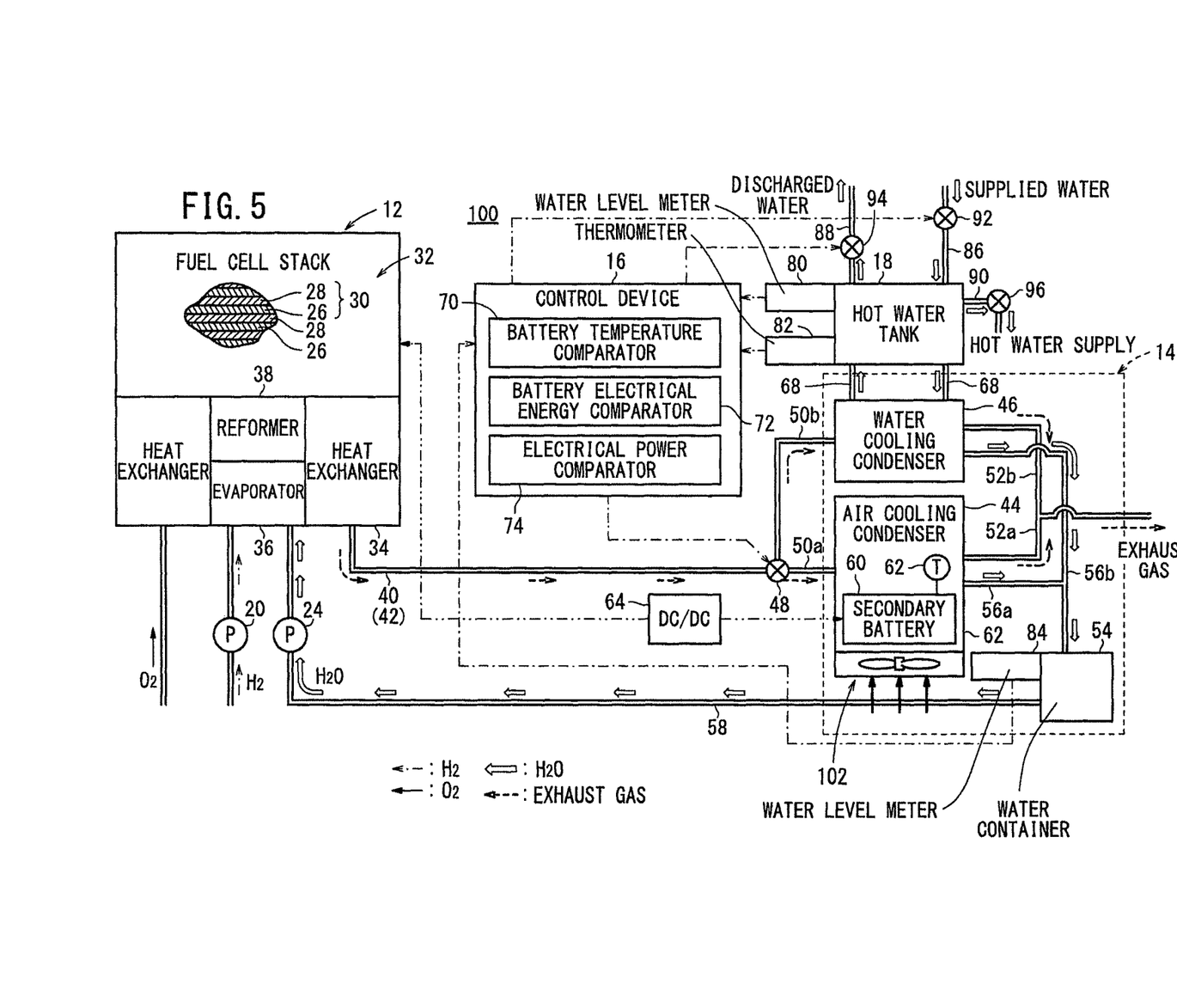
FIG. 5 is a diagram schematically showing structure of a fuel cell system according to a second embodiment of the present invention.

FIG. 5 is a diagram schematically showing a fuel cell system 100 according to a second embodiment of the present invention.

The constituent elements that are identical to those of the fuel cell system according to the first embodiment are labeled with the same reference numerals, and description thereof will be omitted.

In the fuel cell system 100, an air cooling fan 102 is attached to the air cooling condenser 44. Therefore, in the air cooling condenser 44, the external air (oxygen-containing gas) forcibly supplied from the air cooling fan 102 cools the exhaust gas discharged from the fuel cell stack 32, and the external air is used as a coolant during discharging of the secondary battery 60.

In this manner, in the second embodiment, the same advantages as in the case of the first embodiment are obtained. For example, water self-sustaining operation and thermally self-sustaining operation are facilitated, and overall efficiency and load following performance are improved advantageously.

Although certain embodiments of the present invention have been shown and described in detail, it should be understood that various changes and modifications may be made to the embodiments without departing from the scope of the invention as set forth in the appended claims.

The invention claimed is:
1. A fuel cell system comprising:
a fuel cell module for generating electrical energy by electrochemical reactions of a fuel gas and an oxygen-containing gas;
a condenser for condensing water vapor in an exhaust gas discharged from the fuel cell module by heat exchange between the exhaust gas and a coolant to collect the condensed water and supplying the collected condensed water to the fuel cell module;
a control device; and
a hot water storage unit for storing hot water,
wherein the condenser includes: a water cooling condensing mechanism using hot water stored in the hot water storage unit as the coolant; and an air cooling condensing mechanism using as the coolant the oxygen-containing gas that is not yet supplied to the fuel cell module;
the air cooling condensing mechanism includes a secondary battery for inducing endothermic reaction during charging and inducing exothermic reaction during discharging; and
the control device implements control to use the exhaust gas as a heat medium during charging, and use as the coolant during discharging the oxygen-containing gas that is not yet supplied to the fuel cell module to keep a temperature of the secondary battery in a chargeable and dischargeable state, and includes:
a battery temperature comparator for comparing at least a battery temperature of the secondary battery with a predetermined battery temperature range, and a battery electrical energy comparator for comparing battery electrical energy of the secondary battery with a predetermined battery electrical energy range, the control device regulates a flow rate of the exhaust gas supplied to the air cooling condensing mechanism and determines to charge or discharge the secondary battery based on the comparing performed by each of the battery temperature comparator and the battery electrical energy comparator such that:

when the battery temperature of the secondary battery is less than a lower limit of the predetermined battery temperature range, the battery temperature of the secondary battery is increased by increasing the flow rate of the exhaust gas supplied into the air cooling condensing mechanism;

when the temperature of the secondary battery is greater than or equal to the lower limit of the predetermined battery temperature range and is less than an upper limit of the predetermined battery temperature range, the flow rate of the exhaust gas supplied into the air cooling condenser is maintained;

when the temperature of the secondary battery is greater than or equal to the upper limit of the predetermined battery temperature range, the temperature of the fuel cell is decreased by decreasing the flow rate of the exhaust gas supplied into the air cooling condenser;

when the battery temperature of the secondary battery is less than the lower limit of the predetermined battery temperature range and the battery electrical energy is less than a lower limit of the predetermined battery electrical energy range, charging or discharging of the secondary battery is not performed;

when the battery temperature of the secondary battery is less than the lower limit of the predetermined battery temperature range, the battery electrical energy is greater than or equal to the lower limit of the predetermined battery electrical energy range and less than an upper limit of the predetermined battery electrical energy range, and a requested output is larger than a supplied output, the secondary battery is discharged;

when the battery temperature of the secondary battery is less than the lower limit of the predetermined battery temperature range, the battery electrical energy is greater than or equal to the upper limit of the predetermined battery electrical energy range, and the requested output is larger than the supplied output, the secondary battery is discharged;

when the temperature of the secondary battery is greater than or equal to the lower limit of the predetermined battery temperature range and is less than an upper limit of the predetermined battery temperature range, the battery electrical energy is less than the lower limit of the predetermined battery electrical energy range, and the requested output is smaller than the supplied output, the secondary battery is charged;

when the temperature of the secondary battery is greater than or equal to the lower limit of the predetermined battery temperature range and is less than an upper limit of the predetermined battery temperature range, and the battery electrical energy is greater than or equal to the lower limit of the predetermined battery electrical energy range and is less than the upper limit of the predetermined battery electrical energy range, the secondary battery is discharged when the requested output is larger than the supplied output, while the secondary battery is charged when the requested output is smaller than the supplied output;

when the temperature of the secondary battery is greater than or equal to the lower limit of the predetermined battery temperature range and is less than an upper limit of the predetermined battery temperature range, the battery electrical energy is greater than or equal to the upper limit of the predetermined battery electrical energy range, and the requested output is larger than the supplied output, the secondary battery is discharged;

when the temperature of the secondary battery is greater than or equal to the upper limit of the predetermined battery temperature range, the battery electrical energy is less than the lower limit of the predetermined battery electrical energy range, and the requested output is smaller than the supplied output, the secondary battery is charged;

when the temperature of the secondary battery is greater than or equal to the upper limit of the predetermined battery temperature range, the battery electrical energy is greater than or equal to the lower limit of the predetermined battery electrical energy range and less than the upper limit of the predetermined battery electrical energy range, and the requested output is smaller than the supplied output, the secondary battery is charged; and when the temperature of the secondary battery is greater than or equal to the upper limit of the predetermined battery temperature range, and the battery electrical energy is greater than or equal to the upper limit of the predetermined battery electrical energy range, charging or discharging of the secondary battery is not performed, and the fuel cell system further comprises a regulator valve for regulating the flow rate of the exhaust gas supplied to the air cooling condensing mechanism and a flow rate of the exhaust gas supplied to the water cooling condensing mechanism.

2. The fuel cell system according to claim 1, wherein the secondary battery is a molten salt electrolyte battery or a sodium-sulfur battery.

3. The fuel cell system according to claim 1, wherein the hot water storage unit includes:
   a hot water level detector for detecting a water level of the hot water; and
   a hot water temperature detector for detecting a temperature of the hot water.

4. The fuel cell system according to claim 1, wherein the condenser includes:
   a water container for storing the condensed water; and
   a condensed water level detector for detecting a water level of the condensed water in the water container.

5. The fuel cell system according to claim 1, further comprising a fuel cell stack formed by stacking a plurality of fuel cells, the fuel cells each including an electrolyte electrode assembly and a separator stacked together, the electrolyte electrode assembly including an anode, a cathode, and an electrolyte interposed between the anode and the cathode;
   a heat exchanger for heating the oxygen-containing gas before the oxygen-containing gas is supplied to the fuel cell stack;
   an evaporator for evaporating the water to produce a mixed fuel of water vapor and a raw fuel chiefly containing hydrocarbon; and
   a reformer for reforming the mixed fuel to produce the fuel gas.

6. The fuel cell system according to claim 1, wherein the fuel cell module is a solid oxide fuel cell module.

7. The fuel cell system according to claim 1, wherein an air cooling fan is attached to the air cooling condensing mechanism.

* * * * *